United States Patent
Zhang et al.

(10) Patent No.: US 10,311,601 B2
(45) Date of Patent: Jun. 4, 2019

(54) 3D MOTION CORRECTION USING 3D DEFORMABLE REGISTRATION AND PATIENT RESPIRATORY SIGNALS

(71) Applicant: Siemens Healthcare GmbH, Erlangen (DE)

(72) Inventors: Li Zhang, Princeton, NJ (US); Marcel Dominik Nickel, Herzogenaurach (DE); Tongbai Meng, Ellicott City, MD (US)

(73) Assignee: Siemens Healthcare GmbH, Erlangen (DE)

( * ) Notice: Subject to any disclaimer, the term of this patent is extended or adjusted under 35 U.S.C. 154(b) by 124 days.

(21) Appl. No.: 15/611,851

(22) Filed: Jun. 2, 2017

(65) Prior Publication Data
US 2018/0089826 A1 Mar. 29, 2018

Related U.S. Application Data

(60) Provisional application No. 62/399,703, filed on Sep. 26, 2016.

(51) Int. Cl.
G06T 11/00 (2006.01)
G06T 7/30 (2017.01)

(52) U.S. Cl.
CPC .............. *G06T 11/003* (2013.01); *G06T 7/30* (2017.01); *G06T 2207/10088* (2013.01)

(58) Field of Classification Search
None
See application file for complete search history.

(56) References Cited

U.S. PATENT DOCUMENTS

2005/0054910 A1* 3/2005 Tremblay ............... A61B 5/055
600/411
2009/0312625 A1* 12/2009 Du ........................ G01R 33/485
600/410
2012/0083687 A1* 4/2012 Parker .................... A61B 5/024
600/419

OTHER PUBLICATIONS

Dubois et al., "Correction strategy for diffusion-weighted images corrupted with motion: application to the DTI evaluation of infants' white matter," Magnetic Resonance Imaging 32, 2014, pp. 981-992 (Year: 2014).*
Gmitro et al., "Radial GRASE: Implementation and Applications," Magnetic Resonance in Medicine, 53:1363-1371 (2005) (Year: 2005).*
Koh, D. M., & Collins, D. J. (2007). Diffusion-weighted MRI in the body: applications and challenges in oncology. American Journal of Roentgenology, 188(6), 1622-1635.

(Continued)

*Primary Examiner* — Soo Shin

(57) ABSTRACT

Embodiments can provide a computer-implemented method for 3D motion correction for diffusion weighted imaging images, the method comprising acquiring a series of image slices from a medical imaging device; binning the series of image slices into bins, each bin comprising a plurality of slice locations; identifying, for each of the B-values, a dominating breathing state wherein at least one of the plurality of slice locations of the dominating breathing state contains an image slice from the series of images; identifying, for each of the B-values, one or more non-dominating breathing states; and registering, for each of the B-values, all of the one or more non-dominating breathing states to the dominating breathing state.

20 Claims, 6 Drawing Sheets

(56) References Cited

OTHER PUBLICATIONS

Schmid-Tannwald, Christine, et al. "Diffusion-weighted MRI of the abdomen: Current value in clinical routine." Journal of Magnetic Resonance Imaging 37.1 (2013): Abstract only.
Ehman RL, McNamara MT, Pallack M, Hricak H, Higgins CB, "Magnetic resonance imaging with respiratory gating: techniques and advantages", AJR Am J Roentgenol. Dec. 1984; 143(6):1175-82.

* cited by examiner

3D MOTION CORRECTION USING 3D DEFORMABLE REGISTRATION AND PATIENT RESPIRATORY SIGNALS

TECHNOLOGY FIELD

This application claims the benefit of U.S. Provisional Application Ser. No. 62/399,703 filed Sep. 26, 2016, which is incorporated herein by reference in its entirety.

The present invention relates generally to methods, systems, and apparatuses for utilizing patient respiratory signals and 3D deformable registration in order to provide three-dimensional motion correction for two-dimensional acquisition based (Magnetic Resonance) MR sequences, such as diffusion weighted imaging.

BACKGROUND

Respiratory motion management is a common challenge for many MR thoracic and abdominal applications. A breath-hold is typically 10-20 seconds, however most MR measurement sequences take much longer to complete. Therefore, motion needs to be carefully controlled in such applications for diagnostic quality imaging. In the case of diffusion weighted imaging (DWI) the acquisition of a single image is relatively fast compared to a breathing cycle, however the signal to noise ratio of a single acquisition is typically too low for diagnosis. While averaging multiple acquisitions can effectively improve signal to noise ratio, critical structure edges are also blurred if significant motion is present during the acquisition.

For clinically desired image quality, respiratory triggered MR sequences are used as the current state-of-art approaches to address the motion beside simple averaging with the associated loss in sharpness. Triggered acquisitions come at the expense of extended scan time. Furthermore triggering requires an additional hardware device such as a respiratory belt or additional acquisition modules. For instance, Siemens Magnetom Trio provides the Physiological Measurement Unit (PMU) as an option to control MR sequence using a patient's physiological signal, including respiration.

SUMMARY

Embodiments can provide a computer-implemented method for 3D motion correction for diffusion weighted imaging images, the method comprising acquiring a series of image slices from a medical imaging device; binning the series of image slices into bins based on breathing state, each bin comprising a plurality of slice locations; identifying, for each of the B-values, a dominating breathing state wherein at least one of the plurality of slice locations of the dominating breathing state contains an image slice from the series of images; identifying, for each of the B-values, one or more non-dominating breathing states; and registering, for each of the B-values, all of the one or more non-dominating breathing states to the dominating breathing state.

Embodiments can further provide a method further comprising if less than all of the plurality of slice locations of the dominating breathing state contain an image slice from the series of image slices, interpolating one or more additional images into the one or more empty slice locations.

Embodiments can further provide a method further comprising if less than all of the plurality of slice locations of the dominating breathing state contain an image slice from the series of image slices, interpolating one or more additional images taken from the one or more non-dominating breathing states into the one or more empty slice locations.

Embodiments can further provide a method further comprising identifying a breathing state for each of the images in the series of images using a physiological monitoring unit value measured at the time each of the images is acquired.

Embodiments can further provide a method further comprising registering each of the image slices in the series of image slices to a motion-free reference space.

Embodiments can further provide a method wherein the motion-free reference space is the dominating breathing state.

Embodiments can further provide a method further comprising calculating a correlation of one or more motion states between the image slices acquired during a time period.

In another illustrative embodiment, a non-transitory computer program product comprising a computer usable or readable medium having a computer readable program is provided. The computer readable program, when executed on a processor, causes the processor to perform various ones of, and combinations of, the operations outlined above with regard to the method illustrative embodiment.

In yet another illustrative embodiment, a system is provided. The system may comprise a medical imaging device comprising an imaging processor configured to perform various ones of, and combinations of, the operations outlined above with regard to the method illustrative embodiment.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF ILLUSTRATIVE EMBODIMENTS

The following disclosure describes the present invention according to several embodiments directed at methods, systems, and apparatuses related to using three dimensional deformable registration and patient respiratory data as methods for three dimensional motion correction in two dimensional acquisition methods. In this invention, a method to compensate motion artifacts in different acquisitions using respiratory signal values from physiological monitoring unit (PMU) can be used. Based on PMU values, the dominating breathing state can be identified, and then all the other acquisitions can be warped to this dominating breathing state for motion-free DWI acquisitions of all B-values and slice locations. The invention can target the 2D acquisition based MR sequences, like DWI. During such acquisitions, 2D images can be repeatedly acquired at certain locations over time. The breathing state for each image can be identified by the PMU value measured together with the image, if PMU signals are available.

Figure 1:
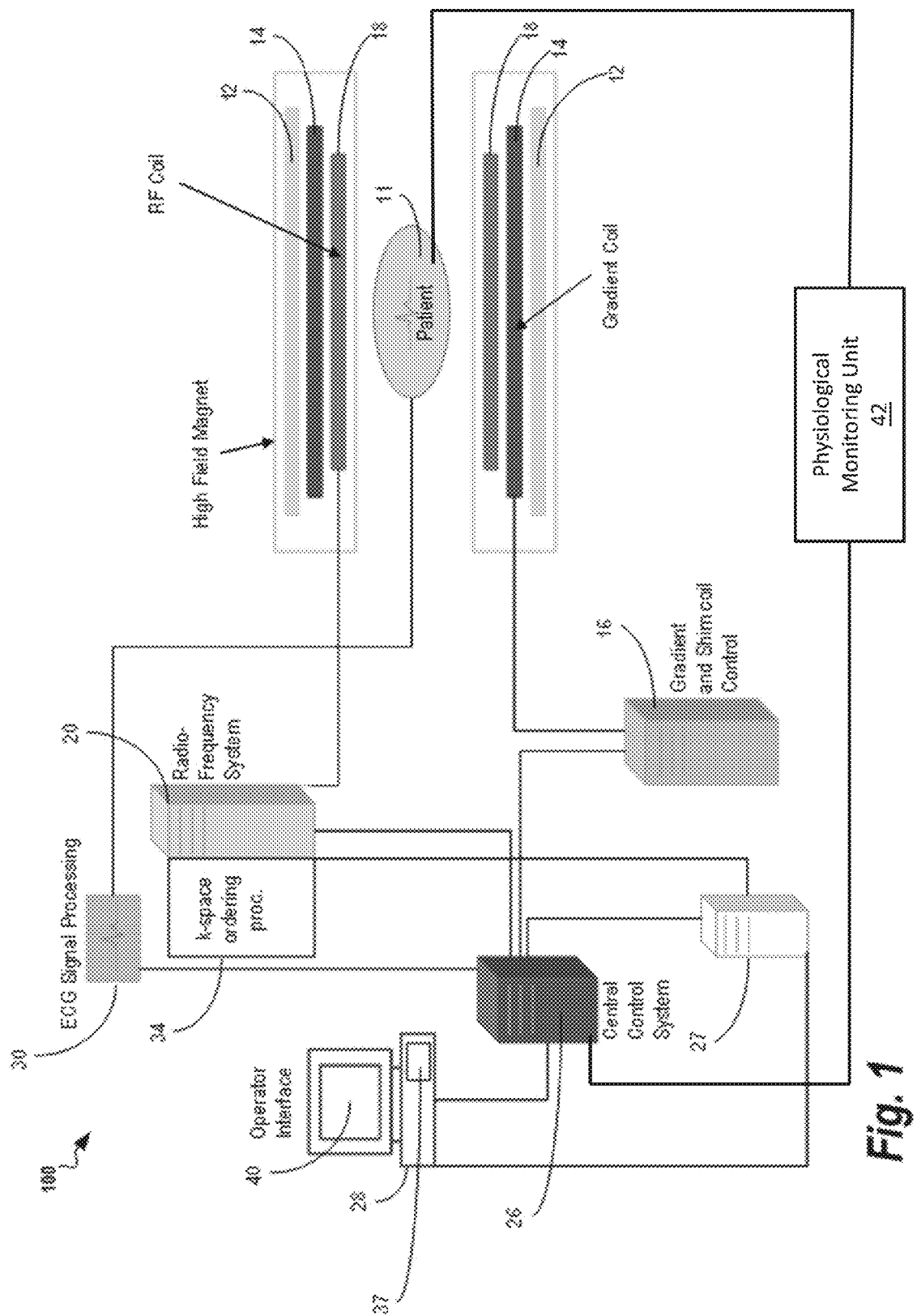
FIG. 1 shows a medical imaging device for acquiring diffusion weighted images, as used by some embodiments of the present invention.

FIG. 1 shows a medical imaging device 100 for acquiring diffusion weighted images, as used by some embodiments of the present invention. In medical imaging device 100, magnetic coils 12 create a static base magnetic field in the body of patient 11 to be imaged and positioned on a table. Within the magnet system are gradient coils 14 for producing position dependent magnetic field gradients superimposed on the static magnetic field. Gradient coils 14, in response to gradient signals supplied thereto by a gradient and shim coil control module 16, produce position dependent and shimmed magnetic field gradients in three orthogonal directions and generates magnetic field pulse sequences. The shimmed gradients compensate for inhomogeneity and variability in a Magnetic Resonance Imaging (MRI) device magnetic field resulting from patient anatomical variation and other sources. The magnetic field gradients include a slice-selection gradient magnetic field, a phase-encoding gradient magnetic field and a readout gradient magnetic field that are applied to patient 11.

Further Radio Frequency (RF) module 20 provides RF pulse signals to RF coil 18, which in response produces magnetic field pulses which rotate the spins of the protons in the imaged body of the patient 11 by ninety degrees or by one hundred and eighty degrees for so-called "spin echo" imaging, or by angles less than or equal to 90 degrees for so-called "gradient echo" imaging. Gradient and shim coil control module 16 in conjunction with RF module 20, as directed by central control unit 26, control slice-selection, phase-encoding, readout gradient magnetic fields, radio frequency transmission, and magnetic resonance signal detection, to acquire magnetic resonance signals representing planar slices of patient 11.

In response to applied RF pulse signals, the RF coil 18 receives magnetic resonance signals, i.e., signals from the excited protons within the body as they return to an equilibrium position established by the static and gradient magnetic fields. The magnetic resonance signals are detected and processed by a detector within RF module 20 and k-space component processor unit 34 to provide a magnetic resonance dataset to an image data processor for processing into an image. In some embodiments, the image data processor is located in central control unit 26. However, in other embodiments such as the one depicted in FIG. 1, the image data processor is located in a separate unit 27. Electrocardiography (ECG) synchronization signal generator 30 provides ECG signals used for pulse sequence and imaging synchronization. A two or three dimensional k-space storage array of individual data elements in k-space component processor unit 34 stores corresponding individual frequency components comprising a magnetic resonance dataset. The k-space array of individual data elements has a designated center and individual data elements individually have a radius to the designated center.

A magnetic field generator (comprising coils 12, 14, and 18) generates a magnetic field for use in acquiring multiple individual frequency components corresponding to individual data elements in the storage array. The individual frequency components are successively acquired in an order in which the radius of respective corresponding individual data elements increases and decreases along a substantially spiral path as the multiple individual frequency components are sequentially acquired during acquisition of a magnetic resonance dataset representing a magnetic resonance image. A storage processor in the k-space component processor unit 34 stores individual frequency components acquired using the magnetic field in corresponding individual data elements in the array. The radius of respective corresponding individual data elements alternately increases and decreases as multiple sequential individual frequency components are acquired. The magnetic field acquires individual frequency components in an order corresponding to a sequence of substantially adjacent individual data elements in the array and magnetic field gradient change between successively acquired frequency components which are substantially minimized.

Central control unit 26 uses information stored in an internal database to process the detected magnetic resonance signals in a coordinated manner to generate high quality images of a selected slice(s) of the body (e.g., using the image data processor) and adjusts other parameters of medical imaging device 100. The stored information comprises predetermined pulse sequence and magnetic field gradient and strength data as well as data indicating timing, orientation and spatial volume of gradient magnetic fields to be applied in imaging. Generated images are presented on display 40 of the operator interface. Computer 28 of the operator interface includes a graphical user interface (GUI) enabling user interaction with central control unit 26 and enables user modification of magnetic resonance imaging signals in substantially real time. Continuing with reference to FIG. 1, display processor 37 processes the magnetic resonance signals to reconstruct one or more images for presentation on display 40, for example. Various techniques generally known in the art may be used for reconstruction. A physiological monitoring unit (PMU) 42 can be used to monitor physiological signals that emanate from the patient 11, including, but not limited to, respiration, heartrate, blood pressure, and pulse oximetry.

Figure 2:
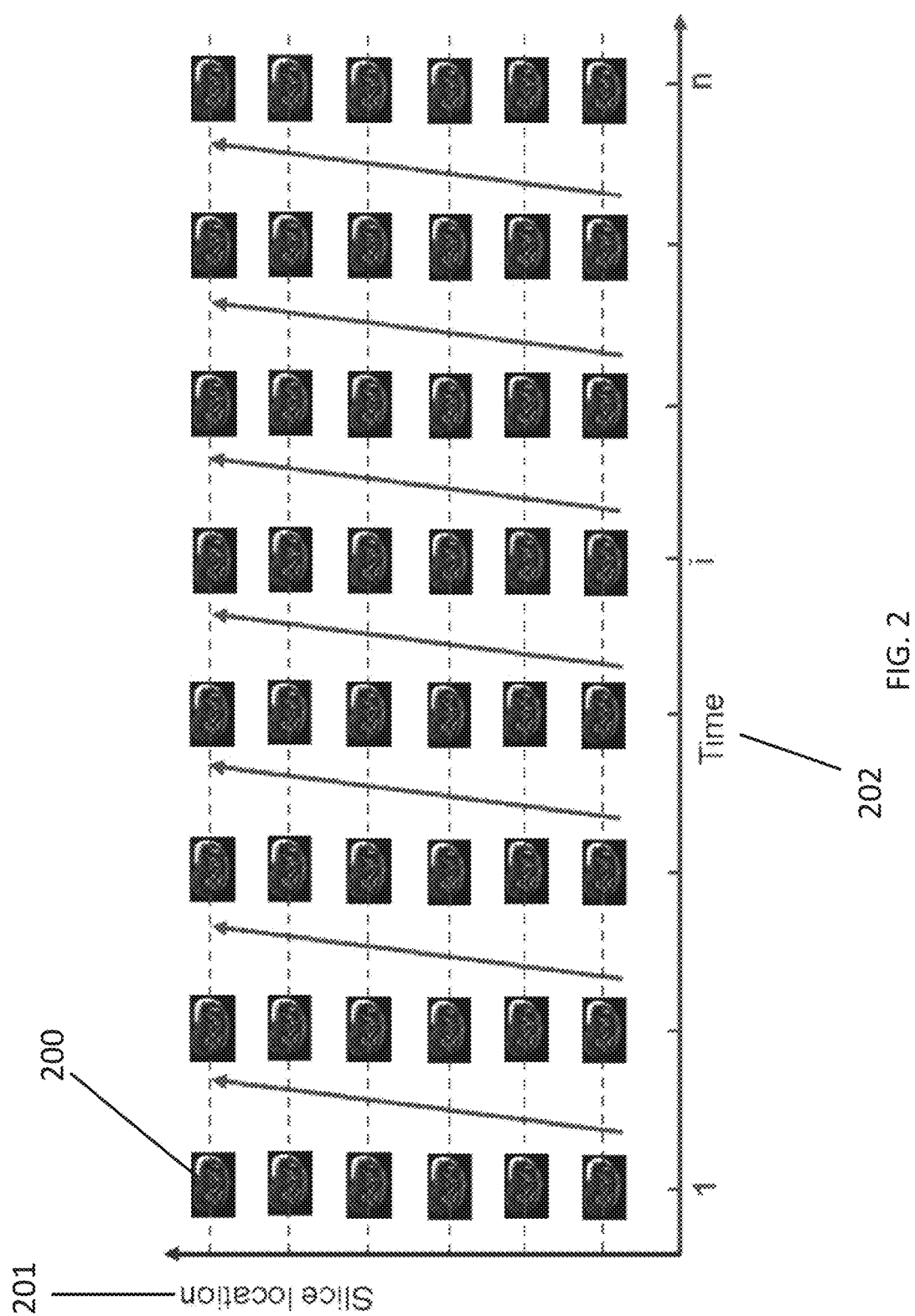
FIG. 2 illustrates a sample ideal two-dimensional (2D) MR acquisition sequence.

FIG. 2 illustrates a sample ideal two-dimensional (2D) MR acquisition sequence. During such an acquisition, 2D images 200 can be repeatedly acquired at certain bodily locations (or slice locations 201) over a set period of time 202. The breathing state for each image can be identified by the physiological monitoring unit (PMU) 42 (as shown in FIG. 1) value measured together with the image 200 in relation to the time 202 the image was taken. In an embodiment, PMU signals may not be available. Breathing states can be organized according to bins.

Figure 3:
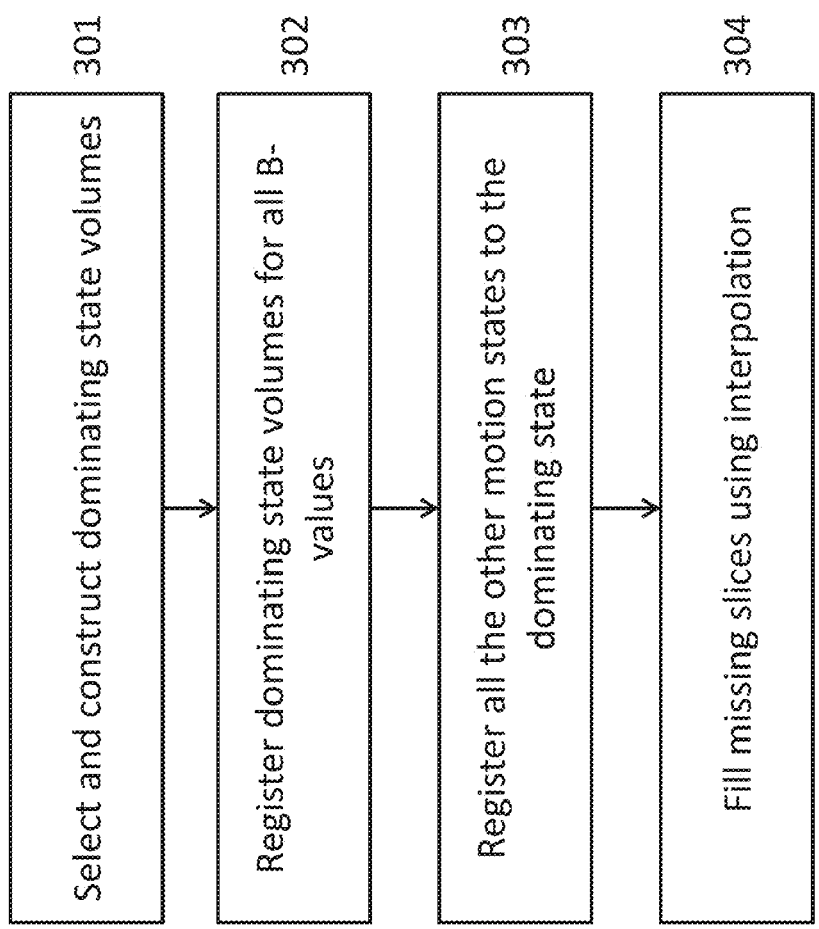
FIG. 3 illustrates a flowchart depicting the functionality of the motion correction system, in accordance with embodiments discussed herein.
Figure 4:
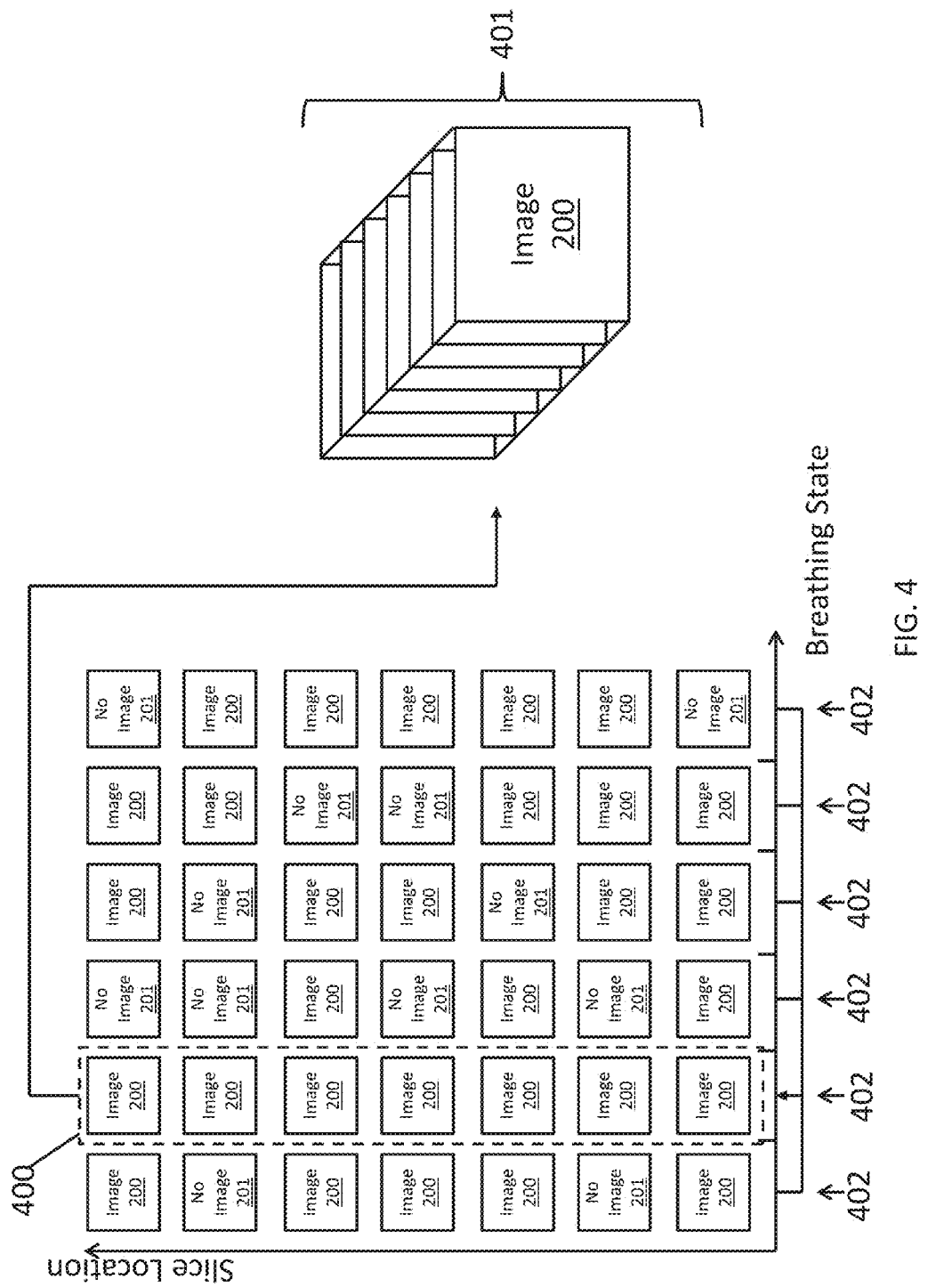
FIG. 4 illustrates the identification of a dominating breathing state, in accordance with embodiments discussed herein.

FIG. 3 illustrates a flowchart depicting the functionality of the motion correction system, in accordance with embodiments discussed herein. The motion correction system can function using three major states. First, the system can identify a dominating breathing state 301. The dominating breathing state is defined herein as the breathing state in which the most image slices are acquired. For example, FIG. 4 shows acquisition sequence where a plurality of image slices (each labeled Image 200) are acquired over a plurality of breathing states (each labeled breathing state 402). These breathing states may be derived, for example, from the breathing states acquired using the respiratory signal values from the PMU 42 (as shown in FIG. 1). During the acquisition sequence, there are one or more Breathing States 402 where an image slice is not acquired (labeled No Image 201). As shown in FIG. 4, the dominating breathing 400 can be determined as the Breathing State 402 with the most Image 200 acquisitions, as opposed to a state where No Images 201 outweigh Images 200 taken. Additionally, the dominating breathing state 400 can have all or almost all of its slice locations have at least one Image 200 acquisition. The combination of these characteristics can be used to find the dominating breathing state 400, which in turn can be used to generate a dominating breathing state volume 401, comprising one or more Images 200 from the dominating breathing state 400.

Figure 5:
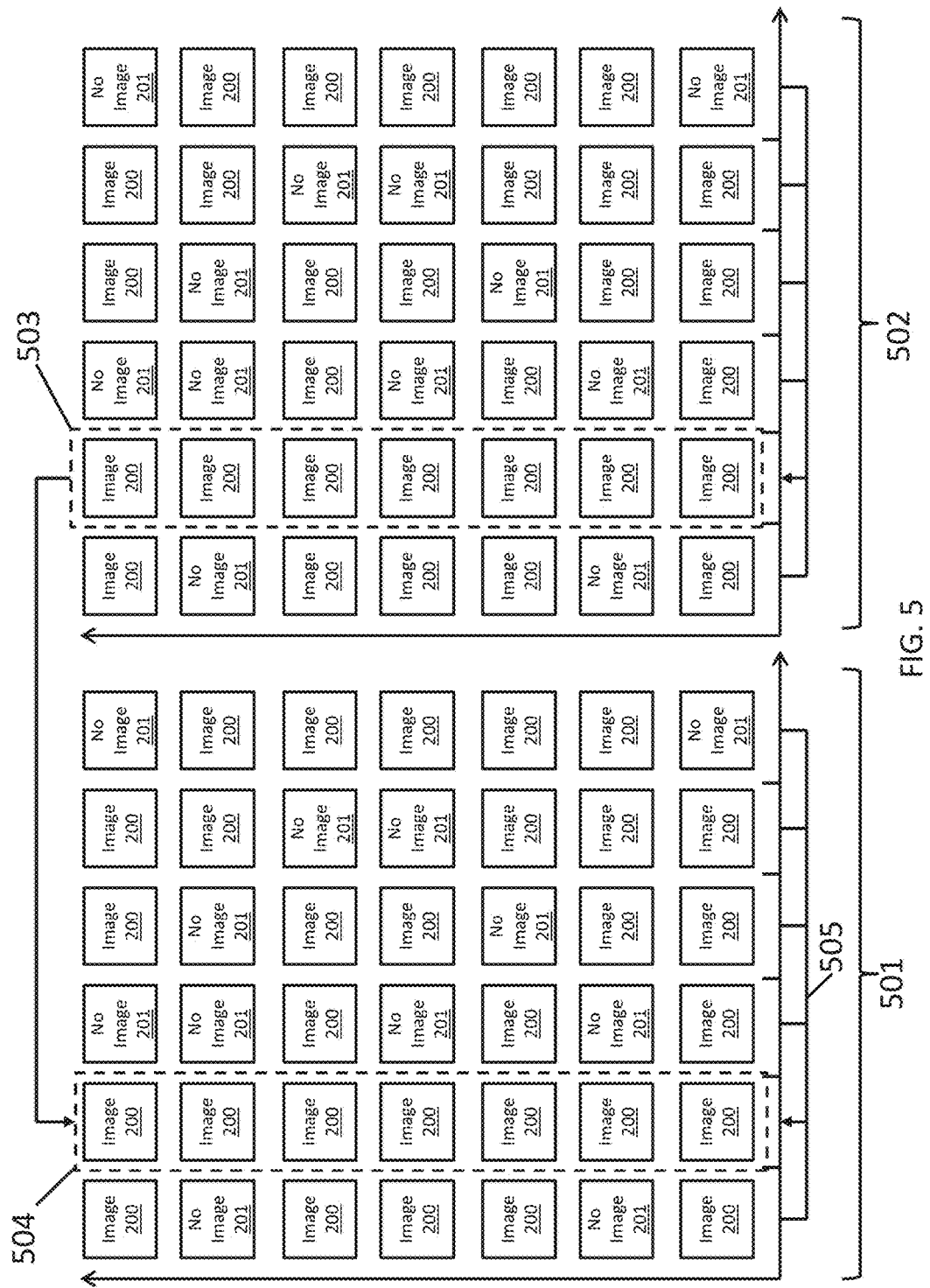
FIG. 5 illustrates registration of non-dominating breathing states to dominating breathing states within and between B-values, in accordance with embodiments discussed herein.

Returning to FIG. 3, after identifying a dominating breathing state volumes at 301, the system can register the dominating breathing state volumes for all B-values 302. As is generally understood in the art, the term B-value identifies the strength and timing of the gradients used in generating diffusion-weighted images. For further processing, all images can be registered to one motion-free reference space (motion-free reference space B-value 501 as shown in FIG. 5). A particular B-value can be chosen as the motion-free reference space if its intensity distribution is closest to corresponding B-value images, which can produce more accurate registration results. In order to support further processing, such as an analog to digital conversion (ADC) map calculation, all acquired images can be registered to one motion-free reference space, which in this instance can be the dominating breathing state identified previously. In an embodiment, acquisition data may not be available for a slice location in the dominating breathing state, and missing slices can be interpolated from neighboring slices.

The system can register all other motion states to the dominating breathing state at 303. Within each B-value, all non-dominating breathing state volumes can be registered to the dominating breathing state volume that has already been deformed to the reference space. FIG. 5 illustrates the cross B-value registration, in accordance with embodiments described herein. Images from the dominating breathing state 503 of the non-motion-free reference space B-value 502 can be registered to the dominating breathing state 504 of the motion-free reference space B-value 501. Non-dominating breathing states, and occasionally dominating breathing states, do not have acquisitions on every slice location. In this situation, the missing slices can be filled using interpolation 505 within the B-value to produce a dominating breathing state 504 volume that comprises a complete set of Images 200.

In alternate embodiments, the motion state binning can also be performed based on image contents, such as by calculating correlation of motion states between slices that can be acquired around the same time (for instance, by enforcing a measure that requires similar motion states in subsequent acquisitions), and by using image similarity (for instance, enforcing a strong correlation between images of the same slice in the same motion state). In an alternate embodiment, the system can be designed with real-time feedback, wherein the motion state can be determined in real-time (for instance, through detection of the amplitude of the PMU signal), and the ordering of the acquisitions can be adjusted such that the dominating motion state can be filled as much as possible for each slice position.

Figure 6:
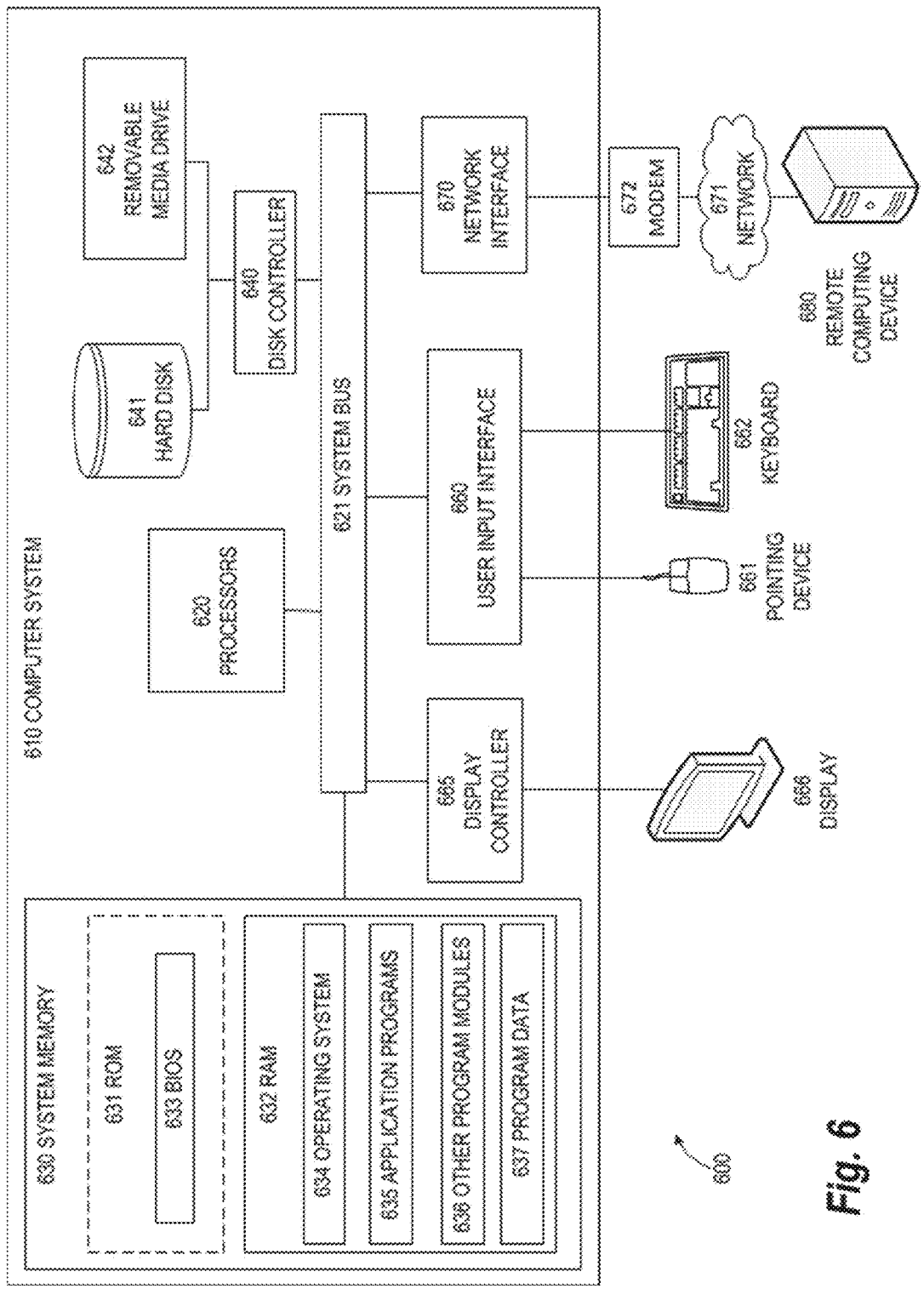
FIG. 6 illustrates an exemplary computing environment within which embodiments of the invention may be implemented.

FIG. 6 illustrates an exemplary computing environment 600 within which embodiments of the invention may be implemented. For example, the computing environment 600 may be used to implement one or more of the components illustrated in the medical imaging device 100 of FIG. 1. The computing environment 600 may include computer system 610, which is one example of a computing system upon which embodiments of the invention may be implemented. Computers and computing environments, such as computer system 610 and computing environment 600, are known to those of skill in the art and thus are described briefly here.

As shown in FIG. 6, the computer system 610 may include a communication mechanism such as a bus 621 or other communication mechanism for communicating information within the computer system 610. The computer system 610 further includes one or more processors 620 coupled with the bus 621 for processing the information. The processors 620 may include one or more central processing units (CPUs), graphical processing units (GPUs), or any other processor known in the art.

The computer system 610 also includes a system memory 630 coupled to the bus 621 for storing information and instructions to be executed by processors 620. The system memory 630 may include computer readable storage media in the form of volatile and/or nonvolatile memory, such as read only memory (ROM) 631 and/or random access memory (RAM) 632. The system memory RAM 632 may include other dynamic storage device(s) (e.g., dynamic RAM, static RAM, and synchronous DRAM). The system memory ROM 631 may include other static storage device(s) (e.g., programmable ROM, erasable PROM, and electrically erasable PROM). In addition, the system memory 630 may be used for storing temporary variables or other intermediate information during the execution of instructions by the processors 620. A basic input/output system (BIOS) 633 containing the basic routines that help to transfer information between elements within computer system 610, such as during start-up, may be stored in ROM 631. RAM 632 may contain data and/or program modules that are immediately accessible to and/or presently being operated on by the processors 620. System memory 630 may additionally include, for example, operating system 634, application programs 635, other program modules 636 and program data 637.

The computer system 610 also includes a disk controller 640 coupled to the bus 621 to control one or more storage devices for storing information and instructions, such as a hard disk 641 and a removable media drive 642 (e.g., floppy disk drive, compact disc drive, tape drive, and/or solid state drive). The storage devices may be added to the computer system 610 using an appropriate device interface (e.g., a small computer system interface (SCSI), integrated device electronics (IDE), Universal Serial Bus (USB), or FireWire).

The computer system 610 may also include a display controller 665 coupled to the bus 621 to control a display 666, such as a cathode ray tube (CRT) or liquid crystal display (LCD), for displaying information to a computer user. The computer system includes an input interface 660 and one or more input devices, such as a keyboard 662 and a pointing device 661, for interacting with a computer user and providing information to the processor 620. The pointing device 661, for example, may be a mouse, a trackball, or a pointing stick for communicating direction information and command selections to the processor 620 and for controlling cursor movement on the display 666. The display 666 may provide a touch screen interface which allows input to supplement or replace the communication of direction information and command selections by the pointing device 661.

The computer system 610 may perform a portion or all of the processing steps of embodiments of the invention in response to the processors 620 executing one or more sequences of one or more instructions contained in a memory, such as the system memory 630. Such instructions may be read into the system memory 630 from another computer readable medium, such as a hard disk 641 or a removable media drive 642. The hard disk 641 may contain one or more datastores and data files used by embodiments of the present invention. Datastore contents and data files may be encrypted to improve security. The processors 620 may also be employed in a multi-processing arrangement to execute the one or more sequences of instructions contained in system memory 630. In alternative embodiments, hard-wired circuitry may be used in place of or in combination with software instructions. Thus, embodiments are not limited to any specific combination of hardware circuitry and software.

As stated above, the computer system 610 may include at least one computer readable medium or memory for holding instructions programmed according to embodiments of the invention and for containing data structures, tables, records, or other data described herein. The term "computer readable medium" as used herein refers to any medium that participates in providing instructions to the processor 620 for execution. A computer readable medium may take many forms including, but not limited to, non-volatile media, volatile media, and transmission media. Non-limiting examples of non-volatile media include optical disks, solid state drives, magnetic disks, and magneto-optical disks, such as hard disk 641 or removable media drive 642. Non-limiting examples of volatile media include dynamic memory, such as system memory 630. Non-limiting examples of transmission media include coaxial cables, copper wire, and fiber optics, including the wires that make up the bus 621. Transmission media may also take the form of acoustic or light waves, such as those generated during radio wave and infrared data communications.

The computing environment 600 may further include the computer system 610 operating in a networked environment using logical connections to one or more remote computers, such as remote computer 680. Remote computer 680 may be a personal computer (laptop or desktop), a mobile device, a server, a router, a network PC, a peer device or other common network node, and typically includes many or all of the elements described above relative to computer system 610. When used in a networking environment, computer system 610 may include modem 672 for establishing communications over a network 671, such as the Internet. Modem 672 may be connected to bus 621 via user network interface 670, or via another appropriate mechanism.

Network 671 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 610 and other computers (e.g., remote computer 680). The network 671 may be wired, wireless or a combination thereof. Wired connections may be implemented using Ethernet, Universal Serial Bus (USB), RJ-11 or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 671.

The embodiments of the present disclosure may be implemented with any combination of hardware and software. In addition, the embodiments of the present disclosure may be included in an article of manufacture (e.g., one or more computer program products) having, for example, computer-readable, non-transitory media. The media has embodied therein, for instance, computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

We claim:

1. A computer-implemented method for 3D motion correction for diffusion weighted imaging images, the method comprising:
acquiring a series of image slices from a medical imaging device;
binning the series of image slices into bins based on breathing states, each bin comprising a plurality of slice locations, and each bin corresponding to a different breathing state;
identifying, for each of one or more B-values, a dominating breathing state having the most image slices in the series of image slices, wherein each image slice of the dominating breathing state is acquired at a different slice location;
identifying, for each of the B-values, one or more non-dominating breathing states having less image slices in the series of image slices than the dominating breathing state; and
registering, for each of the B-values, all of the one or more non-dominating breathing states to the dominating breathing state.

2. The method as recited in claim 1, further comprising:
if less than all of the plurality of slice locations of the dominating breathing state contain an image slice from the series of image slices, interpolating one or more additional image slices in the series of image slices into one or more empty slice locations.

3. The method as recited in claim 2, further comprising:
if less than all of the plurality of slice locations of the dominating breathing state contain an image slice from the series of image slices, interpolating one or more additional image slices in the series of image slices taken from the one or more non-dominating breathing states into the one or more empty slice locations.

4. The method as recited in claim 1, further comprising:
identifying a breathing state for each image slice in the series of image slices using a physiological monitoring unit value measured at a time each image slice in the series of image slices is acquired.

5. The method as recited in claim 1, further comprising:
registering each of the image slices in the series of image slices to a motion-free reference space.

6. The method as recited in claim 5, wherein the motion-free reference space is the dominating breathing state.

7. The method as recited in claim 1, further comprising:
calculating a correlation of one or more motion states between the image slices acquired during a time period.

8. A computer program product for 3D motion correction for diffusion weighted imaging images, the computer program product comprising a non-transitory computer readable storage medium having program instructions embodied therewith, the program instructions executable by a processor to cause the processor to:
acquire a series of image slices from a medical imaging device;
bin the series of image slices into bins based on breathing state, each bin comprising a plurality of slice locations, and each bin corresponding to a different breathing state;
identify, for each of one or more B-values, a dominating breathing state having the most image slices in the series of image slices, wherein each image slice of the dominating breathing state is acquired at a different slice location;
identify, for each of the B-values, one or more non-dominating breathing states having less image slices in the series of image slices than the dominating breathing state; and
register, for each of the B-values, all of the one or more non-dominating breathing states to the dominating breathing state.

9. The computer program product as recited in claim 8, wherein the processor is further caused to:
if less than all of the plurality of slice locations of the dominating breathing state contain an image slice from the series of image slices, interpolate one or more additional image slices in the series of image slices into one or more empty slice locations.

10. The computer program product as recited in claim 9, wherein the processor is further caused to:
if less than all of the plurality of slice locations of the dominating breathing state contain an image slice from the series of image slices, interpolate one or more additional image slices in the series of image slices taken from the one or more non-dominating breathing states into the one or more empty slice locations.

11. The computer program product as recited in claim 8, wherein the processor is further caused to:
identify a breathing state for each image slice in the series of image slices using a physiological monitoring unit value measured at a time each image slice in the series of image slices is acquired.

12. The computer program product as recited in claim 8, wherein the processor is further caused to:
register each of the image slices in the series of image slices to a motion-free reference space.

13. The computer program product as recited in claim 12, wherein the motion-free reference space is the dominating breathing state.

14. The computer program product as recited in claim 8, wherein the processor is further caused to:
calculate a correlation of one or more motion states between the image slices acquired during a time period.

15. A system for 3D motion correction for diffusion weighted imaging images, the system comprising:
a medical imaging device comprising a physiological monitoring unit and an image data processor configured to:
acquire a series of image slices from the medical imaging device;
bin the series of image slices into bins based on breathing state, each bin comprising a plurality of slice locations, and each bin corresponding to a different breathing state;
identify, for each of one or more B-values, a dominating breathing state having the most image slices in the series of image slices, wherein each image slice of the dominating breathing state is acquired at a different slice location;
identify, for each of the B-values, one or more non-dominating breathing states having less image slices in the series of image slices than the dominating breathing state; and
register, for each of the B-values, all of the one or more non-dominating breathing states to the dominating breathing state.

16. The system as recited in claim 15, wherein the image data processor is further configured to:

if less than all of the plurality of slice locations of the dominating breathing state contain an image slice from the series of image slices, interpolate one or more additional image slices in the series of image slices into one or more empty slice locations.

17. The system as recited in claim 16, wherein the image data processor is further configured to:
if less than all of the plurality of slice locations of the dominating breathing state contain an image slice from the series of image slices, interpolate one or more additional image slices in the series of image slices taken from the one or more non-dominating breathing states into the one or more empty slice locations.

18. The system as recited in claim 15, wherein the image data processor is further configured to:
identify a breathing state for each image slice in the series of images using a physiological monitoring unit value measured from the physiological monitoring unit at a time each image slice in the series of image slices is acquired.

19. The system as recited in claim 15, wherein the image data processor is further configured to:
register each of the image slices in the series of image slices to a motion-free reference space.

20. The system as recited in claim 15, wherein the image data processor is further configured to:
calculate a correlation of one or more motion states between the image slices acquired during a time period.

* * * * *